US010455171B2

(12) United States Patent
Johnson

(10) Patent No.: US 10,455,171 B2
(45) Date of Patent: Oct. 22, 2019

(54) METHODS AND APPARATUS FOR ANTI-ECLIPSE CIRCUIT VERIFICATION

(71) Applicant: SEMICONDUCTOR COMPONENTS INDUSTRIES, LLC, Phoenix, AZ (US)

(72) Inventor: Richard Scott Johnson, Boise, ID (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 5 days.

(21) Appl. No.: 15/895,354

(22) Filed: Feb. 13, 2018

(65) Prior Publication Data

US 2019/0253646 A1   Aug. 15, 2019

(51) Int. Cl.
*H04N 5/359* (2011.01)

(52) U.S. Cl.
CPC .................................. *H04N 5/3598* (2013.01)

(58) Field of Classification Search
CPC ........................... H04N 5/3598; H04N 17/002
See application file for complete search history.

(56) References Cited

U.S. PATENT DOCUMENTS

| 8,952,311 | B2 | 2/2015 | Johnson | |
|---|---|---|---|---|
| 2012/0228609 | A1* | 9/2012 | Okita | H04N 5/374 257/48 |
| 2013/0075584 | A1* | 3/2013 | Yaghmai | H04N 5/272 250/208.1 |
| 2016/0112700 | A1* | 4/2016 | Fei | H04N 5/367 324/750.3 |
| 2016/0295205 | A1 | 10/2016 | Lim | |
| 2016/0373673 | A1* | 12/2016 | Okura | H04N 5/3598 |
| 2017/0085823 | A1* | 3/2017 | Kizuna | H04N 5/3658 |
| 2018/0035108 | A1* | 2/2018 | Chae | H04N 5/3765 |

* cited by examiner

*Primary Examiner* — Jason A Flohre
(74) *Attorney, Agent, or Firm* — The Noblitt Group, PLLC; Hettie L. Haines

(57) ABSTRACT

Various embodiments of the present technology may comprise a method and apparatus for anti-eclipse circuit verification. According to various embodiments, the image sensor is configured to test and/or determine the functionality of the anti-eclipse circuit. In various embodiments, the anti-eclipse circuit may employ redundant circuits and/or devices. In a case where a circuit fault is detected, the image sensor generates an error signal.

14 Claims, 10 Drawing Sheets

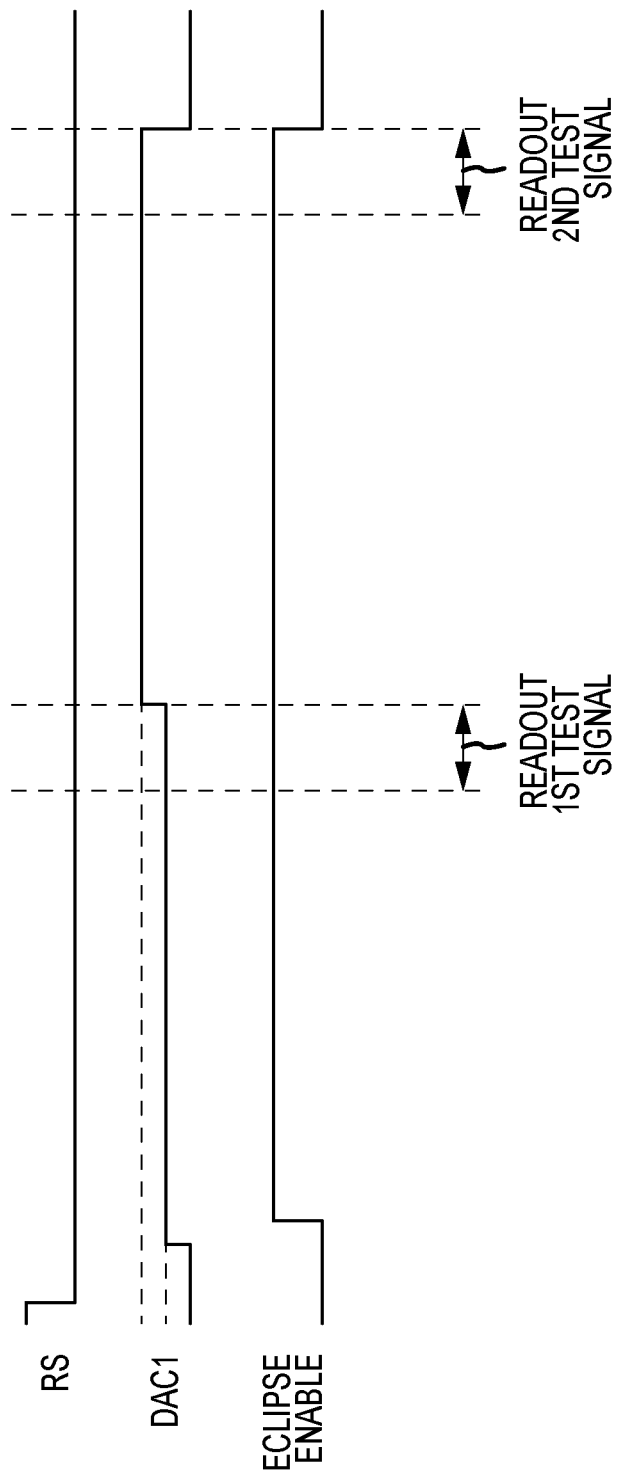

METHODS AND APPARATUS FOR ANTI-ECLIPSE CIRCUIT VERIFICATION

BACKGROUND OF THE TECHNOLOGY

An image sensor may be equipped with an anti-eclipse circuit, which prevents and/or corrects artifacts that result when one or more pixels are exposed to bright light conditions. The bright light conditions cause electrons to spill over from the photodiode into the floating diffusion region, which results in an erroneous signal. For example, a reset signal sampled during a reset operation may exhibit voltage levels that are less than the desired reset level. As a result, the voltage of the pixel signal is also skewed to an undesirably small value and manifests itself as a dark spot, when it should be a bright spot. This phenomenon is generally referred to as "eclipsing," or a "black-sun artifact."

The circuit paths that connect the anti-eclipse circuit to other control circuits may experience failures, such as broken and/or disconnected wires/connections, that prevent the anti-eclipse circuit from operating in a desirable manner. Conventional testing methodologies are not capable of detecting such failures, and the failure is only discovered during image sensor operation. Further, conventional image sensors that are equipped with an anti-eclipse circuit do not employ any self-testing methods nor do they have a back-up circuit that can be activated in the event of a circuit failure.

SUMMARY OF THE INVENTION

Various embodiments of the present technology may comprise a method and apparatus for anti-eclipse circuit verification. According to various embodiments, the image sensor is configured to test and/or determine the functionality of the anti-eclipse circuit. In various embodiments, the anti-eclipse circuit may employ redundant circuits and/or devices. In a case where a circuit fault is detected, the image sensor generates an error signal.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

FIG. 10 is a timing diagram for operating the circuit in FIG. 2.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various pixel architectures, row select circuits, column circuitry, processing circuits, signal converters, and the like, which may carry out a variety of functions. In addition, the present technology may be practiced in conjunction with any number of systems, such as automotive, aerospace, medical, scientific, surveillance, and consumer electronics, and the systems described are merely exemplary applications for the technology. Further, the present technology may employ any number of conventional techniques for capturing image data, sampling image data, processing image data, and the like. In addition, the present technology may be practiced in conjunction with any image sensor operating mode, such as global reset release mode, global shutter mode, and electronic rolling shutter mode.

Methods and apparatus for anti-eclipse circuit verification according to various aspects of the present technology may operate in conjunction with any suitable electronic system, such as automotive systems (e.g., advanced driver assist systems), "smart devices," wearables, portable electronics, consumer electronics, and the like. Further, methods and apparatus for anti-eclipse circuit verification may be integrated into any suitable imaging system, such as a camera system, video system, machine vision, vehicle navigation, surveillance system, motion detection system, and the like.

Figure 1:
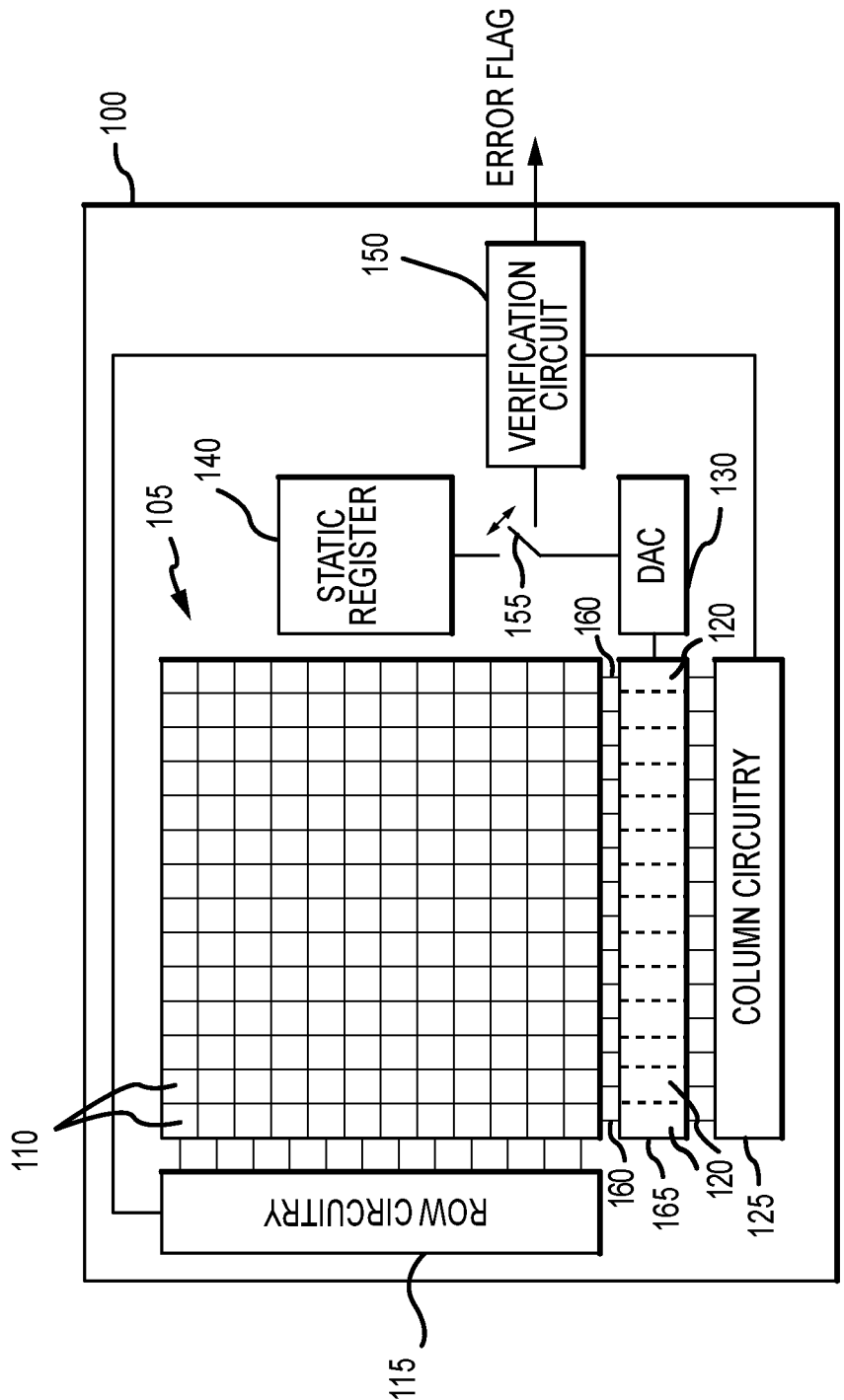
FIG. 1 is a block diagram of an image sensor in accordance with an exemplary embodiment of the present technology.

Referring to FIG. 1, the system may comprise an image sensor 100 to capture image data. For example, light may enter and strike a photosensitive surface of the image sensor 100. The image sensor may further process the image data. For example, the image sensor 100 may convert the light into electrical signals. In various embodiments, the image sensor 100 may be configured as an integrated circuit (i.e., a die) comprising various devices and/or systems to perform various image capture operations and processing functions. For example, the image sensor 100 may comprise a pixel array 105, row circuitry 115, anti-eclipse circuitry 165, and column circuitry 125. The image sensor 100 may be further configured to perform self-testing and/or determine the functionality of the anti-eclipse circuitry 165. For example, the image sensor 100 may comprise a verification circuit 150. The image sensor 100 may be implemented in conjunction with any appropriate technology, such as active pixel sensors in complementary metal-oxide-semiconductors (CMOS) and charge-coupled devices (CCD).

The pixel array 105 detects the light and conveys information that constitutes an image by converting the variable attenuation of waves (as they pass through or reflect off object) into electrical signals. The pixel array 105 may comprise a plurality of pixels 110 arranged in rows and columns, and the pixel array 105 may contain any number of rows and columns, for example, hundreds or thousands of rows and columns. The location of each pixel 110 may be defined by a row number and a column number within the pixel array 105. The pixel array 105 may be electrically connected to and configured to transmit pixel signals to the anti-eclipse circuitry 165.

In various embodiments, the image sensor 100 may further comprise a lens (not shown) configured to focus an image on the pixel array 105. For example the lens may include a fixed and/or adjustable focus lens.

In various embodiments, the image sensor 100 may further comprise a color filter system (not shown), such as a color filter array (CFA), to filter impinging light according to wavelength. The CFA may comprise a pattern of color filters situated on the pixel array 105 to capture color information. For example, a Bayer color filter array comprising a pattern of red, blue, and green filters may be provided, wherein each pixel 110 is covered with one of a red, blue, or green filter. In other embodiments, the CFA may be formed using other color filters, such as a RCCG filter (one red, two clear, and one green), a RCCC filter (one red, and three clear), a CRGB filter (one cyan, one red, one green, and one blue), and any other suitable color pattern. In various embodiments, the CFA may comprise "clear" or transparent filter elements. The CFA may form a 2×2 color pattern, a 4×4 color pattern, a 2×4 color pattern, or any other suitable pattern size. In various embodiments, the CFA may repeat to cover the entire pixel array 105.

Each pixel 110 may comprise a photosensitive region 200 for collecting charge, such as a photogate or photodiode, to detect light and convert the detected light into a charge. Each pixel 110 may further comprise various devices to facilitate various functions, such as charge collection, signal readout, pixel reset, and the like. For example, the each pixel 110 may comprise a plurality of transistors, such as a transfer gate 205, a reset transistor 210, a row select transistor 220, and a source follower transistor 215.

In general, the transfer gate 205 is responsive to a transfer signal TX and operates to transfer charge from the photosensitive region 200 to the source follower transistor 215, and the row select transistor 220 is responsive to a row select signal RS and facilitates readout of the pixel signal. The source follower transistor 215 may operate as an amplifier and convert the charge in the photosensitive region 200 and/or the floating diffusion region FD into a voltage signal. The source follower transistor 215 may be connected to an output line (e.g., a column path) 160 and may output a single pixel output voltage to the output line 160. The source follower transistor 215 may be enabled (i.e., activated) through the row select transistor 220. The particular pixel architecture and operation for each pixel 110 may vary according to a desired image sensor layout, desired functions, and the like.

In various embodiments, the image sensor 100 may comprise a floating diffusion region FD (also known as a floating diffusion node). The floating diffusion region FD may act as a sensing node and may be formed with any device or structure suitable for storing electric charge, such as a diode or capacitor. In various embodiments, multiple photosensitive regions 200 may share one floating diffusion region FD and may be connected, directly or indirectly via one or more transfer gates 205, to the floating diffusion region FD. The number photosensitive regions 200 connected to the floating diffusion region FD may be based on any suitable criteria, such as the desired architecture (physical layout) of the image sensor and/or desired image sensor operation and function.

The row circuitry 115 may receive row addresses from a timing and control unit (not shown) and/or the verification circuit 150 and supply corresponding row control signals, such as the reset signal RST, row select signal RS, the transfer signal TX to the selected pixels 110 over row control paths 255. The row circuitry 115 may further comprise various wires, electrical connections, and/or devices integrated within the pixel array 105 that connect to each pixel 110. According to various embodiments, the row circuitry 115 may selectively activate sequential rows of pixels and transmit (i.e., readout) the pixel signals to the anti-eclipse circuitry 165.

The column circuitry 125 may to perform various operations, such as sampling, amplification, signal conversion, and the like. For example, the column circuitry 125 may comprise various processing circuits, such as a sample and hold circuit (not shown), a signal converter, such as an analog-to-digital converter, a line buffer, and the like. The column circuitry 125 may be connected to the pixel array 105 and/or the anti-eclipse circuitry 165 through multiple output lines (e.g., column paths) 160, where each column of the pixel array 105 has a dedicated output line 160 to transmit the pixel signals. The output lines 160 may be used for transmitting pixel signals from the pixel 110 and/or supplying a bias signal (e.g. bias current or bias voltages).

In various embodiments, the timing and control unit (not shown) may be communicatively connected to or integrated within the image sensor 100 to provide various operation instructions. For example, the timing and control unit may be configured to control an exposure time, adjust the timing of pixel signal readout, control reset operations, and other desired operations according to the particular application.

In general, during image capture, the anti-eclipse circuitry 165 operates in conjunction with a static register 140 to correct and/or counteract erroneous signals that result in an image that exhibits eclipse artifacts. The anti-eclipse circuitry 165 may detect the presence of an eclipse condition by monitoring the voltage level of a reset signal and determining if that voltage level is abnormally low. If so, the anti-eclipse circuitry 165 pulls the reset signal up to a proper level by applying a voltage source to the output line 160. The proper voltage for the voltage source is a normal reset signal voltage level, which is based on the particular characteristics of the image sensor 100 and is stored in the static register 140. According to various embodiments, anti-eclipse circuitry 165 comprises a plurality of anti-eclipse circuits 120, wherein each output line 160 connects a column of pixels to a dedicated anti-eclipse circuit 120. Each anti-eclipse circuit 120 may be further connected to the verification circuit 150 and configured to transmit pixel output voltages to the verification circuit 150.

Figure 2:
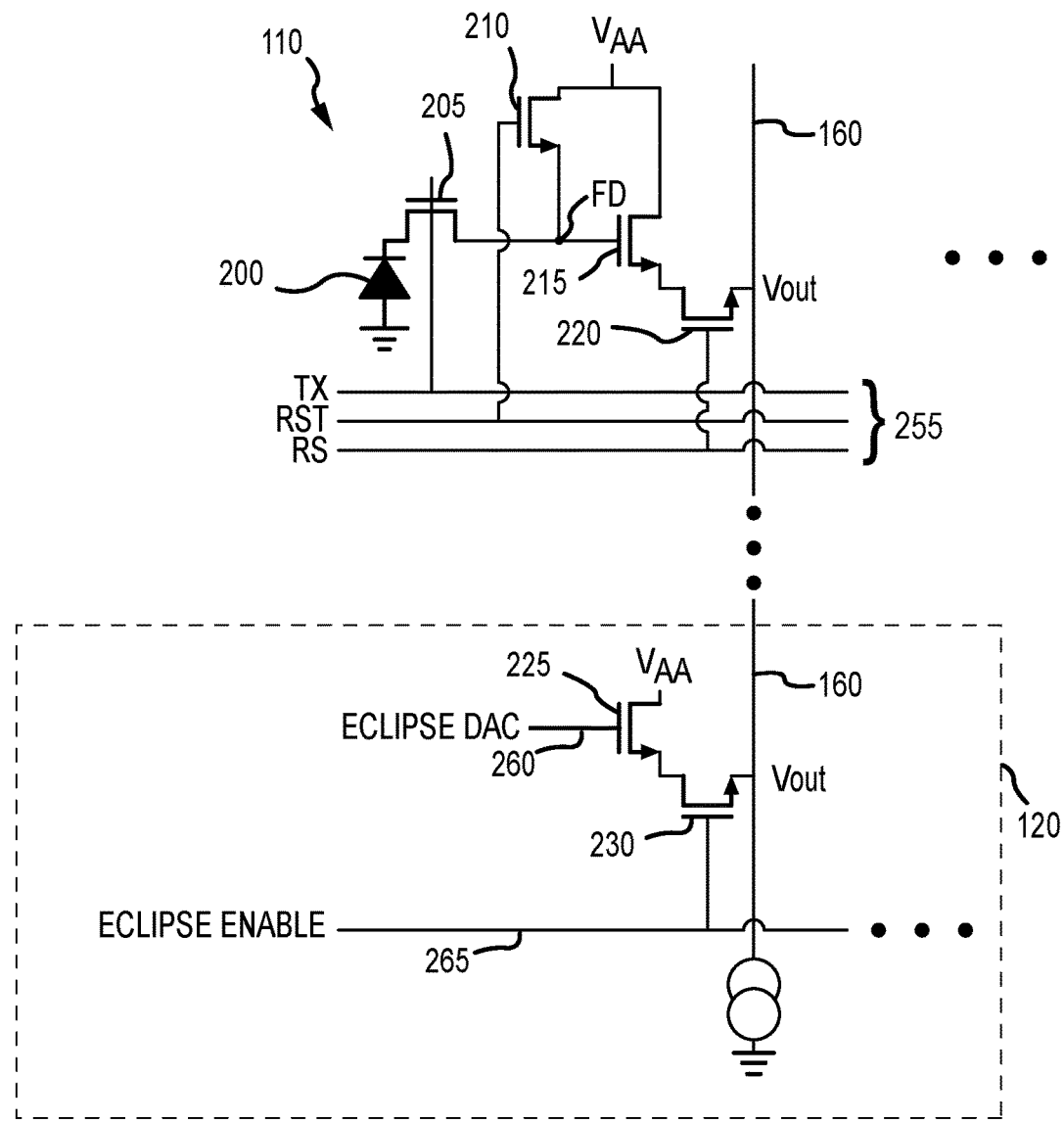
FIG. 2 is a circuit diagram of a portion of an image sensor in accordance with a first embodiment of the present technology.

In a first embodiment, and referring to FIG. 2, the anti-eclipse circuit 120 may comprise a first transistor 225 responsive to a first eclipse DAC signal (eclipse DAC 1) and a first eclipse enable transistor 230 responsive to a first eclipse enable signal (eclipse enable 1). For example, the first eclipse DAC signal may be applied to a gate terminal of the first transistor 225 and the first eclipse enable signal may be applied to a gate terminal of the first eclipse enable transistor 230. The first transistor 225 and the first eclipse enable transistor 230 may be connected at source/drain terminals and the eclipse enable transistor 230 may be further connected to the output line.

Figure 3:
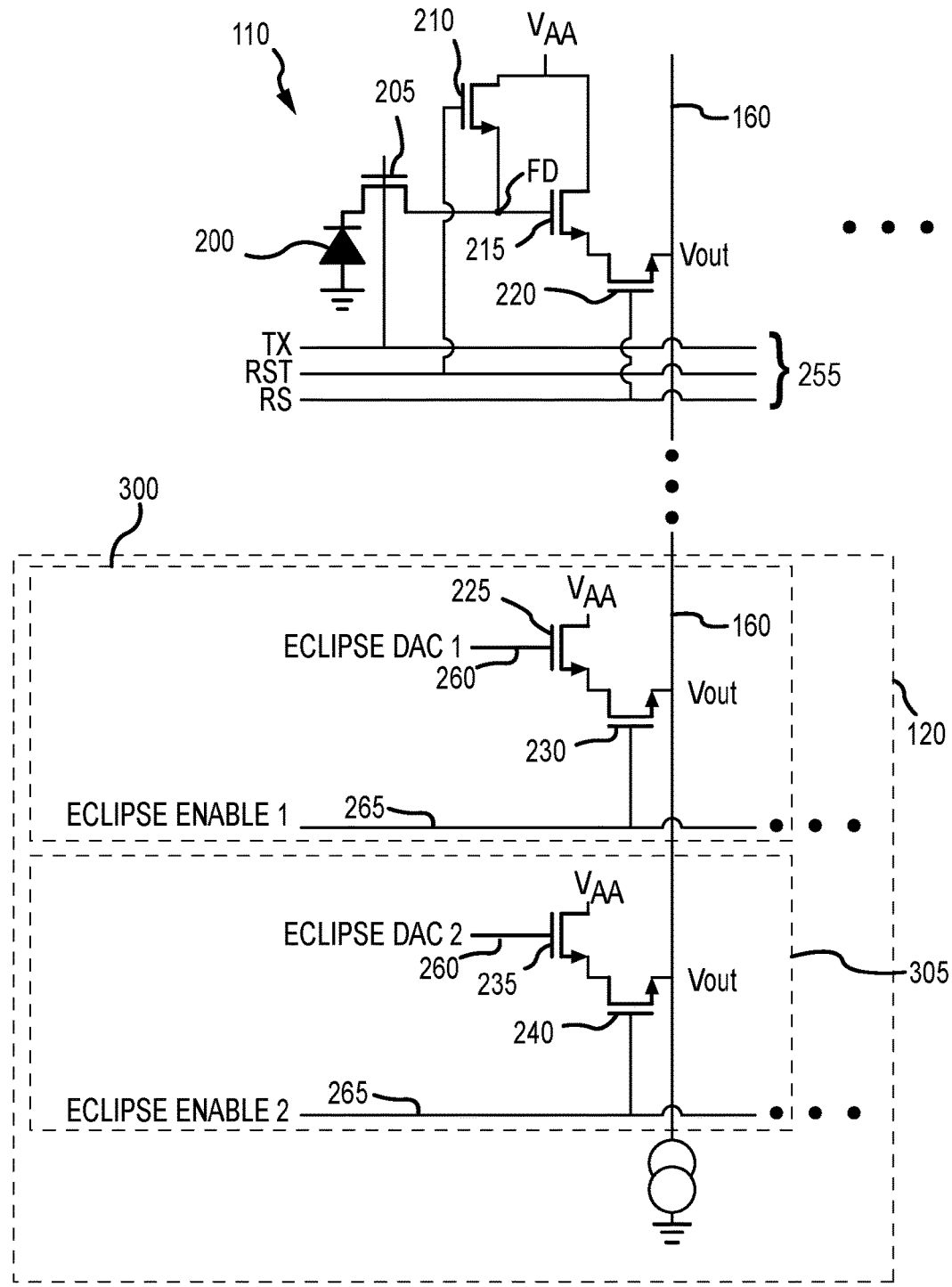
FIG. 3 is a circuit diagram of a portion of an image sensor in accordance with a second embodiment of the present technology.

In a second embodiment, and referring to FIG. 3, the anti-eclipse circuit 120 may comprise redundant circuits and/or devices. For example, the anti-eclipse circuit 120 may comprise the first transistor 225 and the first eclipse enable transistor 230, as described above and referred to as a first sub-circuit 300, as well as a second sub-circuit 305 comprising a second transistor 235 and a second eclipse enable transistor 240. In the present embodiment, the second transistor 235 may be responsive to a second eclipse DAC signal (eclipse DAC 2), and the second eclipse enable transistor 240 may be responsive to a second eclipse enable signal (eclipse enable 2) and may be further connected to the output line. For example, the second eclipse DAC signal may be applied to a gate terminal of the third transistor 235 and the second eclipse enable signal may be applied to a gate terminal of the fourth transistor 240. In the embodiment, the first transistor 225 is directly connected to the first eclipse enable transistor 230 and the second transistor 235 is directly connected to a second eclipse enable transistor 240. The anti-eclipse circuit 120 may comprise any number of sub-circuits.

Figure 4:
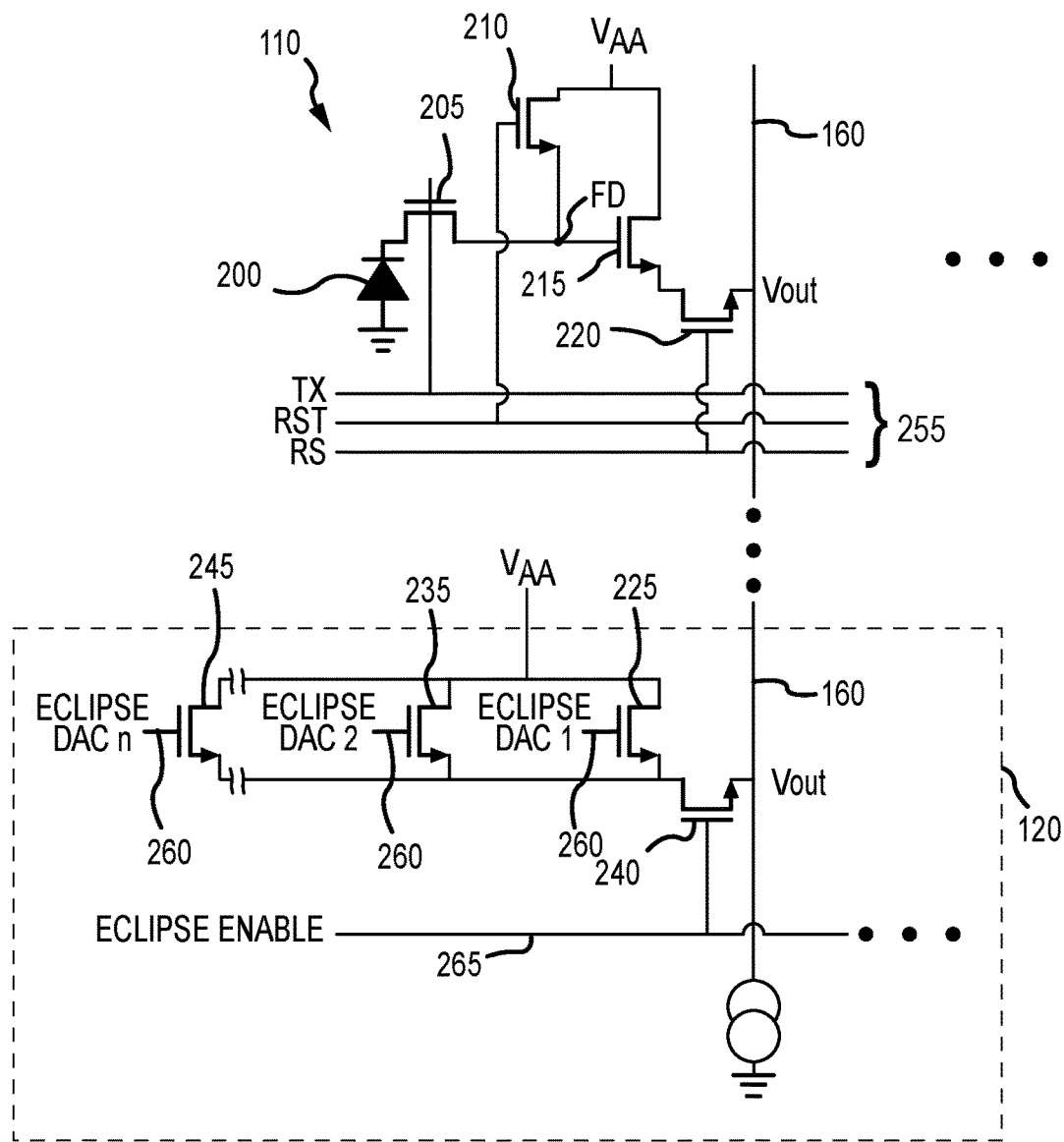
FIG. 4 is a circuit diagram of a portion of an image sensor in accordance with a third embodiment of the present technology.
Figure 5:
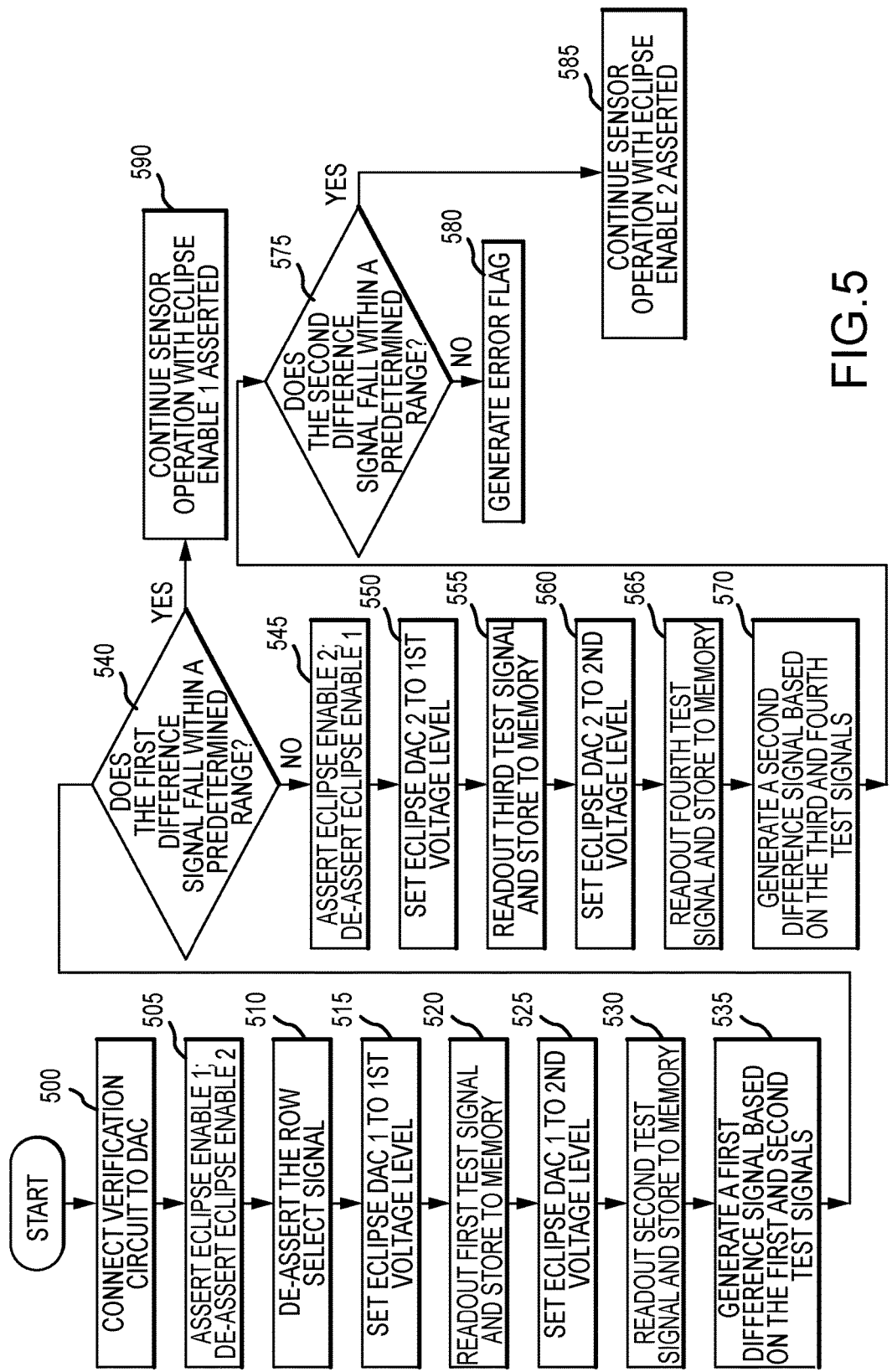
FIG. 5 is a flowchart for operating the circuit in FIG. 3.
Figure 6:
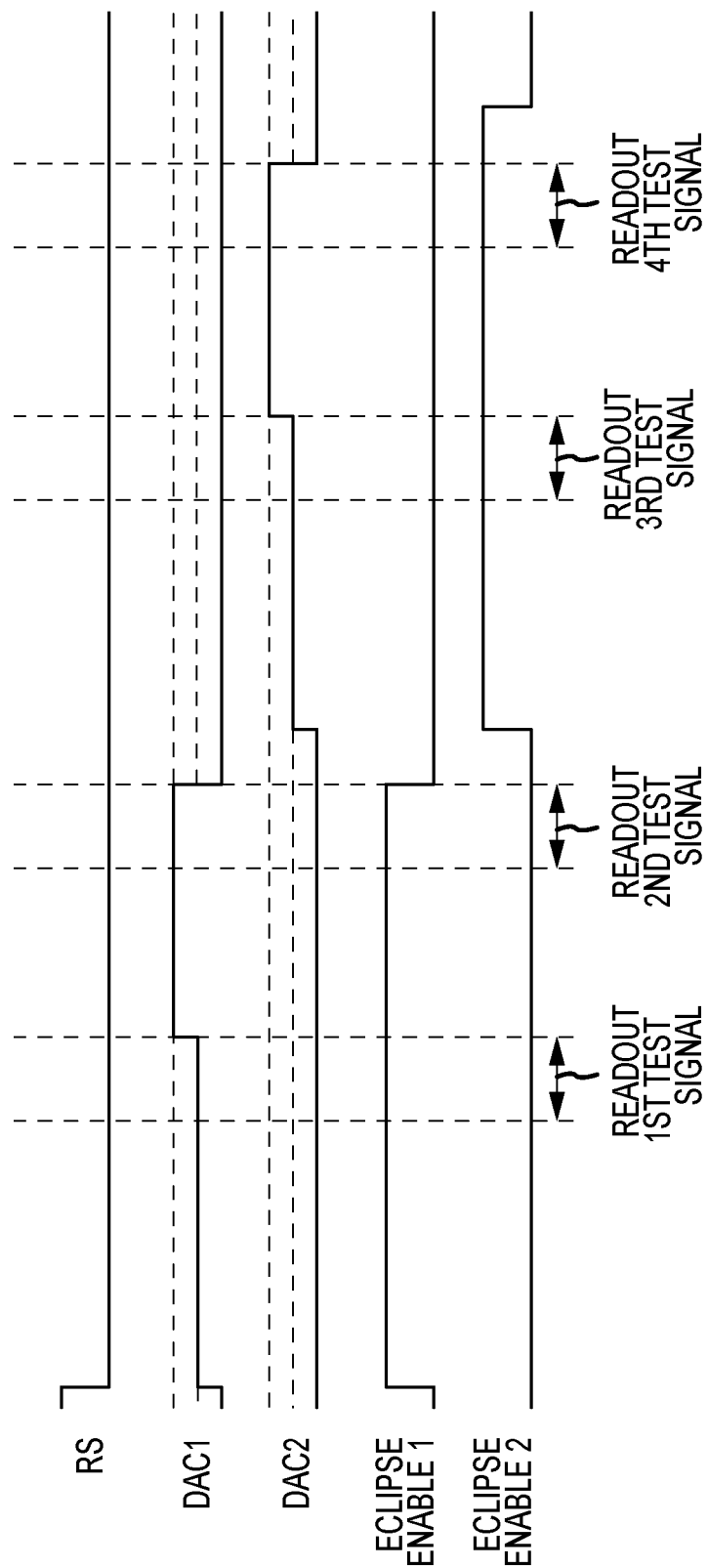
FIG. 6 is a timing diagram for operating the circuit in FIG. 3.
Figure 7:
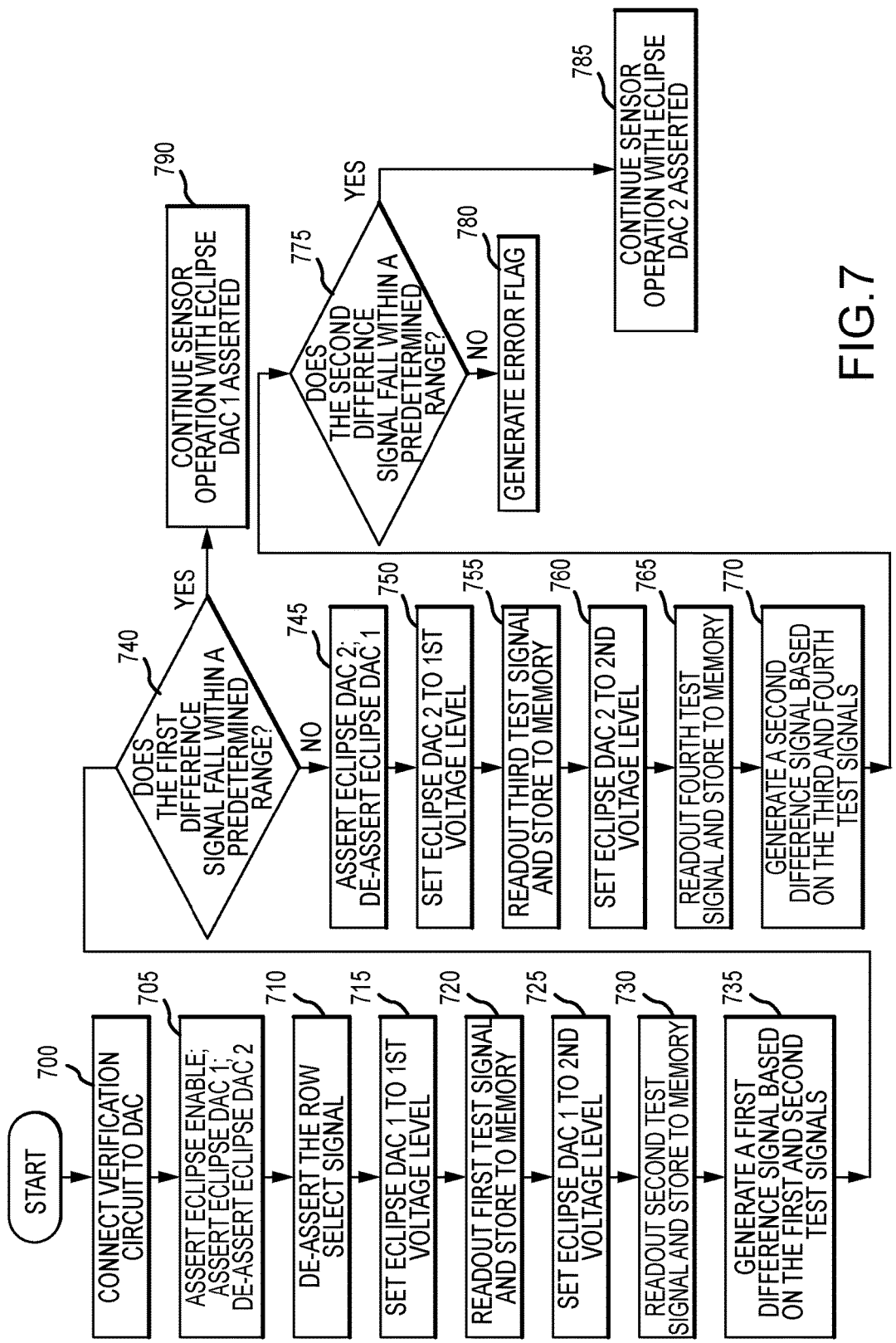
FIG. 7 is a flowchart for operating the circuit in FIG. 4.
Figure 8:
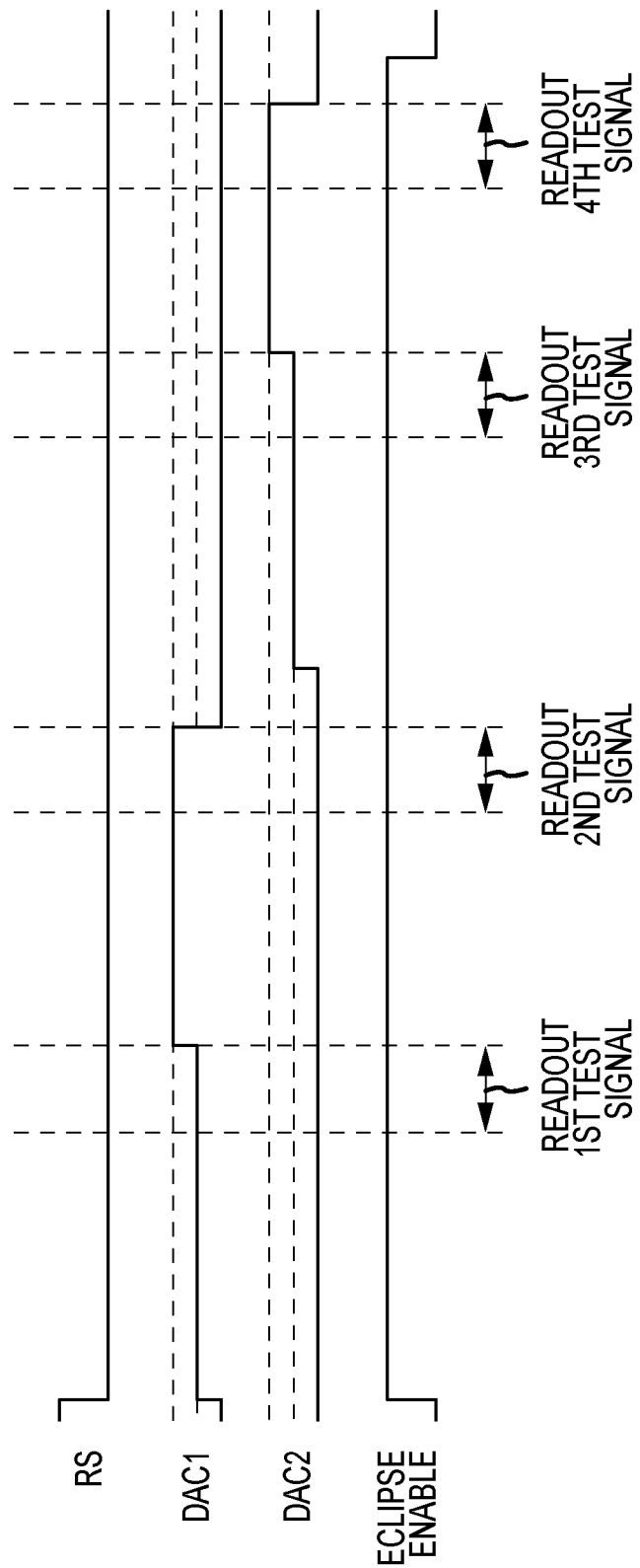
FIG. 8 is a timing diagram for operating the circuit in FIG. 4.
Figure 9:
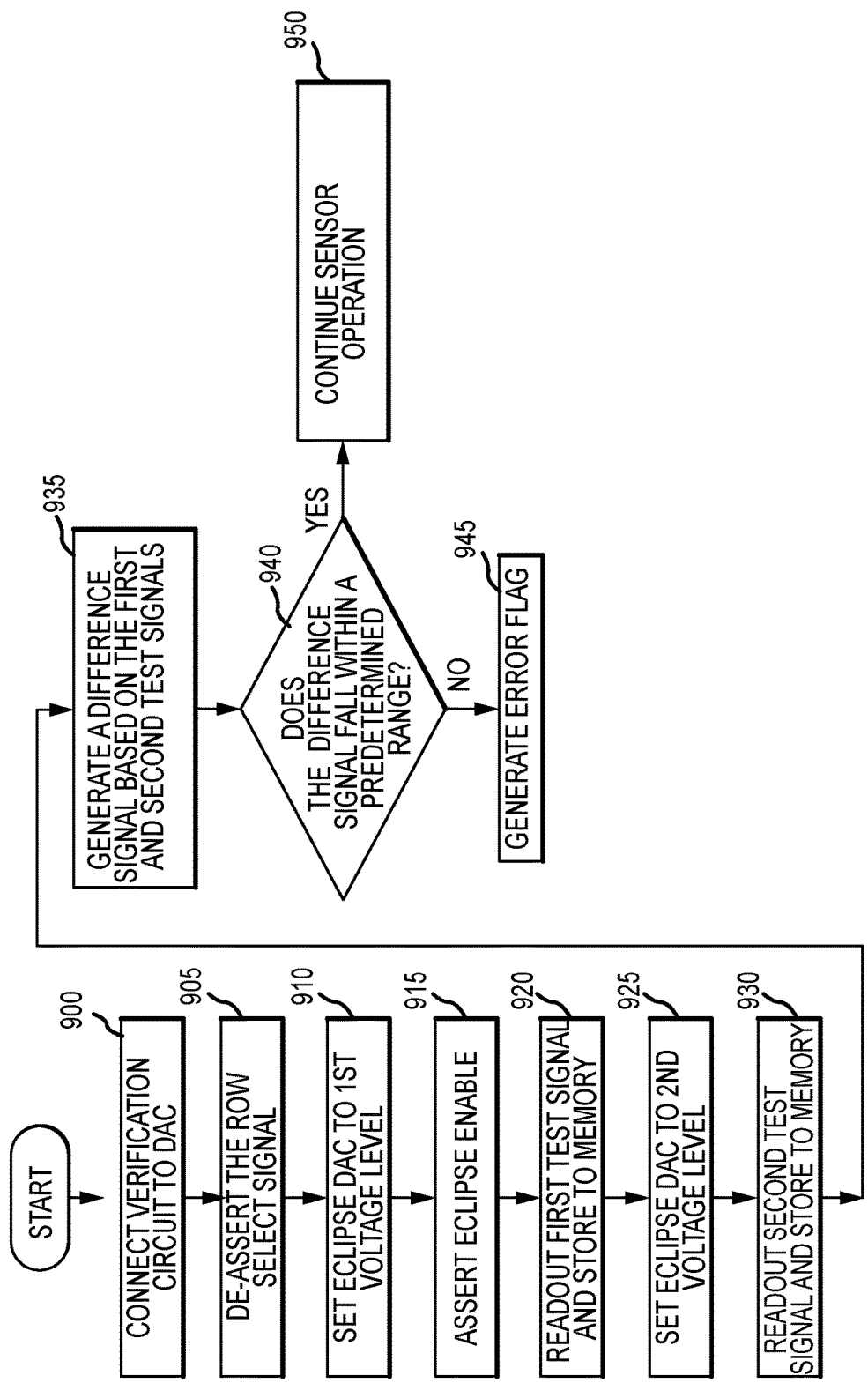
FIG. 9 is a flowchart for operating the circuit in FIG. 2.

In a third embodiment, and referring to FIG. 4, the anti-eclipse circuit 120 may comprise the first and second transistors 225, 230, each responsive to the first eclipse DAC signal and the second eclipse DAC signal, respectively. In the present embodiment, the first and second transistors 225, 235 may be connected in parallel with each other, and each transistor 225, 235 is directly connected to the first eclipse enable transistor 230. For example, drain terminals of each of the first and second transistors 225, 235 may be connected to a reference voltage VAA and source terminals may be connected to a drain terminal of the eclipse enable transistor 230. In the present embodiment, the anti-eclipse circuit 120 may comprise any number transistors connected in parallel with the first and second transistors 225, 235. For example, the anti-eclipse circuit 120 may have n-number of transistors connected in parallel with each other, wherein a last transistor 245 is the $n^{th}$ transistor and responsive to an $n^{th}$ eclipse DAC signal (eclipse DAC n).

According to an exemplary embodiment, the row circuitry 115 may generate and transmit the eclipse enable signals, such as the first eclipse enable signal and the second eclipse enable signal, to the anti-eclipse circuit 120. In alternative embodiments, any suitable circuit and/or system in the image sensor 100 may be configured to generate and transmit the eclipse enable signal to a desired anti-eclipse circuit 120.

Referring to FIGS. 1-4, the verification circuit 150 evaluates circuit connectivity of various circuit paths within the anti-eclipse circuit 120 by performing circuit tests and detecting failures in the anti-eclipse circuit 120. For example, a wire that connects the DAC 130 to the anti-eclipse circuit 120 (i.e., an eclipse DAC line 260) and is used to transmit the eclipse DAC signal, and/or a wire used to transmit the eclipse enable signal (i.e., an eclipse enable line 265), may be broken. This condition may be referred to as a circuit fault and/or circuit failure. In such a case, the anti-eclipse circuit 120 will not function as desired and an eclipse artifact may result. The verification circuit 150 may be selectively connected to the DAC 130, via the switch 155, during a test operation. The verification circuit 150 and/or the row circuitry 115 may be configured to apply various test input signals, such as the eclipse DAC signal and the eclipse enable signal, to the anti-eclipse circuit 120.

The verification circuit 150 may be further configured to receive and store test output voltages as a result of applying the test input signals. For example, the verification circuit 150 may be connected to and configured to receive the test output voltage from the column circuitry 125, and may comprise a memory (not shown) to store the test output voltage. The verification circuit 150 may be further configured to compare two test output voltages, generate a difference voltage from the test output voltages, and determine if the difference voltage falls within a predetermined range. For example, the verification circuit 150 may compare a first test output voltage with a second test output voltage, wherein the first and second test output voltages are generated from the same anti-eclipse circuit 120 of the anti-eclipse circuitry 165. In various embodiments, the verification circuit 150 may generate an error signal (error flag) if a failure is detected. In machine vision applications, such as an automotive application, the error flag may be transmitted to a host system (not shown).

According to various embodiments, the verification circuit 150 may comprise various circuits, logic circuits, memory components, and/or systems suitable for transmitting various test input signals, performing comparisons of two or more signals, and/or storing various data and information. For example, the verification circuit 150 may be implemented in hardware utilizing a field-programmable gate array or an application-specific integrated circuit. In various embodiments, the verification circuit 150 may further receive a clock signal (not shown). The verification circuit 150 may be programmed to perform circuit verification and connectivity at particular intervals, such as after every frame, after every $n^{th}$ frame, and/or upon start-up.

In various embodiments, the image sensor 100 may further comprise a digital-to-analog converter (DAC) 130 to convert a digital signal to an analog signal. For example, the DAC 130 may be selectively connected, via a switch 155, to the static register 140 and the verification circuit 150 and configured to convert a digital signal from the static register circuit or the verification circuit 150 to an analog signal. The DAC 130 may transmit the converted digital signal, such as the eclipse DAC 1 signal and the eclipse DAC 2 signal, to the respective transistor of the anti-eclipse circuit 120.

In operation, and referring to FIGS. 1-10, the method and apparatus evaluates various circuit connectivity of at least one circuit path in the anti-eclipse circuit 120. For example, the method and apparatus may evaluate the circuit connectivity of a circuit path that transmits the eclipse DAC signal and/or a circuit path that transmits the eclipse enable signal. According to various embodiments, the methods and apparatus may be equipped with a self-test mode, wherein the normal operation of the image sensor 100 is suspended and the image sensor 100 performs connectivity evaluations on the anti-eclipse circuit paths. During the self-test mode, the image sensor 100 applies various test voltages to the anti-eclipse circuit 120 and readouts a test output signal, such as a test output voltage Vout, while a particular test voltage is being applied. The resulting test output voltage Vout may then be compared with a test output voltage Vout from a previous test result to generate a difference signal, such as a difference voltage. The image sensor 100 may then determine if the difference voltage is within an expected voltage range. According to various embodiments, the verification circuit 120 may generate an output signal, such as an error signal in a case where a circuit failure is detected, or a verification signal in a case where the circuit path is free of a circuit failure. The test voltages may be repeated for any number of circuit paths and at various time intervals, and/or upon a particular event, such as after each frame, after every $n^{th}$ frame, and/or on start-up.

In a first embodiment, and referring to FIGS. 1, 2, 9 and 10, upon activation of the self-test mode, the verification circuit 150 is connected to the DAC 130 via the switch 155 (900), and the verification circuit 150 de-asserts the row select signal RS via the row circuitry 115 (905). The verification circuit 150 further sets the eclipse DAC signal, via the DAC 130, to a first voltage level (910) and the row circuitry 115 (and/or another suitable circuit) asserts the eclipse enable signal (915). The image sensor 100 transmits a test output voltage Vout from each anti-eclipse circuit 120 and stores the test output voltages Vout in the verification circuit memory (not shown) (920). The column circuitry 125 may operate in conjunction with the anti-eclipse circuit 120 to facilitate readout of the test output voltages Vout. The verification circuit 150 may then set the eclipse DAC signal to a second voltage level (925), read out a second test output voltage Vout in the same manner as described above, and store the second test output voltage to the verification circuit memory (930). The verification circuit 150 may then use the first and second test output voltages to generate the difference voltage (935). For example, the verification circuit 150 may subtract the first and second test output voltages to obtain the difference signal, such as a difference voltage, wherein the test output voltages being subtracted are obtained from the same anti-eclipse circuit 120.

The verification circuit 150 may then determine if the difference voltage is within an expected predetermined range based on the particular levels of the test voltages (940). If the difference voltage falls within the predetermined range, then the image sensor 100 may continue normal operation (950). If the difference voltage does not fall within the predetermined range, then the verification circuit 150 may generate an error flag (i.e., error signal) (945) to indicate that the anti-eclipse circuits 120 may have a circuit failure. The process described above may be applied to each anti-eclipse circuit 120 of the anti-eclipse circuitry 165 simultaneously or serially. In any case, the image sensor 100 will utilize the circuit paths in each anti-eclipse circuit 120 that the verification circuit 150 has confirmed as properly functioning.

In a second embodiment, and referring to FIGS. 1, 3, 5 and 6, upon activation of the self-test mode, the verification circuit 150 is connected to the DAC 130 via the switch 155 (500). The verification circuit 150 facilitates asserting the eclipse enable 1 signal and de-asserting the eclipse enable 2 signal (505), for example via the row circuitry 115, and de-asserts the row select signal RS via the row circuitry 115 (510). The verification circuit 150 then sets the eclipse DAC signal, via the DAC 130, to a first voltage level (515). The image sensor 100 transmits a test output voltage Vout from the anti-eclipse circuit 120 and stores the first test output voltage Vout in the verification circuit memory (not shown) (520). The column circuitry 125 may operate in conjunction with the anti-eclipse circuit 120 to facilitate readout of the test output voltage Vout. The verification circuit 150 may then set the eclipse DAC signal to a second voltage level (525), read out a second test output voltage in the same manner as described above, and store the second test output voltage Vout to the verification circuit memory (530).

The verification circuit 150 may then use the first and second test output voltages of the present embodiment to generate a first difference voltage (535). For example, the verification circuit 150 may subtract first and second test output voltages to obtain the first difference voltage, wherein the test output voltages being subtracted are obtained from the same anti-eclipse circuit 120. The verification circuit 150 may then determine if the first difference voltage is within an expected predetermined range based on the particular levels of the test voltages (940). If the first difference voltage falls within the predetermined range, then the image sensor 100 may continue normal operation with the eclipse enable 1 signal asserted (590).

If the first difference voltage does not fall within the predetermined range, then the verification circuit 150 may facilitate asserting the eclipse enable 2 signal and de-asserting the eclipse enable 1 signal (545). The verification circuit 150 then sets the eclipse DAC 2 signal, via the DAC 130, to a first voltage level (550). The image sensor 100 then reads out a third test output voltage and stores it to the memory (555). The verification circuit 150 then sets the eclipse DAC 2 signal, via the DAC 130, to the second voltage level (560). The image sensor 100 then reads out a fourth test output voltage and stores it to the memory (565). The verification circuit 150 may then use the third and fourth test output voltages to generate a second difference signal, such as a, second difference voltages, in the same manner as described above (570).

The verification circuit 150 may then determine if the second difference voltage is within the expected predetermined range (575). If the second difference voltage falls within the predetermined range, then the image sensor 100 may continue normal operation with the eclipse enable 2 signal asserted (585). If the difference voltage does not fall within the predetermined range, the verification circuit 150 may generate an error flag (i.e., error signal) (580) to indicate that the anti-eclipse circuit 120 may have a circuit failure. The process described above may be applied to each anti-eclipse circuit 120 of the anti-eclipse circuitry 165 simultaneously or serially. In any case, the image sensor 100 will utilize the circuit paths in each anti-eclipse circuit 120 that the verification circuit 150 has confirmed as properly functioning.

In a third embodiment, and referring to FIGS. 1, 4, 7 and 8, upon activation of the self-test mode, the verification circuit 150 is connected to the DAC 130 via the switch 155 (700). The verification circuit 150 facilitates asserting the eclipse enable signal, for example via the row circuitry 115, asserts the eclipse DAC 1 signal, and de-asserts the eclipse DAC 2:*n* signals (705). The verification circuit 150 further de-asserts the row select signal RS via the row circuitry 115 (710). The verification circuit 150 then sets the eclipse DAC 1 signal, via the DAC 130, to a first voltage level (715). The image sensor 100 reads out a first test output voltage Vout from the anti-eclipse circuit 120 and stores the first test output voltage in the verification circuit memory (not shown) (720). The column circuitry 125 may operate in conjunction with the anti-eclipse circuit 120 to facilitate readout of the test output voltage Vout. The verification circuit 150 may then set the eclipse DAC 2 signal to a second voltage level (725), read out a second test output voltage in the same manner as described above, and store the second test output voltage to the verification circuit memory (730).

The verification circuit 150 may then use the first and second test output voltages of the present embodiment to generate a first difference signal, such as a first difference voltage (735). For example, the verification circuit 150 may subtract the first and second test output voltages, wherein the test output voltages being subtracted are obtained from the same anti-eclipse circuit 120. The verification circuit 150 may then determine if the first difference voltage is within an expected predetermined range based on the particular levels of the test voltages (740). If the first difference voltage falls within the predetermined range, then the image sensor 100 may continue normal operation with the eclipse DAC 1 signal asserted (790).

If the first difference voltage does not fall within the predetermined range, then the verification circuit 150 asserts the eclipse DAC 2 signal and de-asserts the eclipse DAC 1 signal (745). The verification circuit 150 then sets the eclipse DAC 2 signal, via the DAC 130, to a first voltage level (750). The image sensor 100 then reads out a third test output voltage and stores it to the memory (755). The verification circuit 150 then sets the eclipse DAC 2 signal, via the DAC 130, to the second voltage level (760). The image sensor 100 then reads out a fourth test output voltage and stores it to the memory (765). The verification circuit 150 may then use the third and fourth test output voltages of the present embodiment to generate a second difference signal, such as a second difference voltage, in the same manner as described above (770).

The verification circuit 150 may then determine if the second difference voltage is within the expected predetermined range (775). If the second difference voltage falls within the predetermined range, then the image sensor 100 may continue normal operation with the eclipse DAC 2 signal asserted (785). If the difference voltage does not fall within the predetermined range, the verification circuit 150 may generate an error flag (i.e., error signal) (780) to indicate that the anti-eclipse circuit 120 may have a circuit failure. The process described above may be applied to each anti-eclipse circuit 120 of the anti-eclipse circuitry 165 simultaneously or serially. In any case, the image sensor 100 will utilize the circuit paths in each anti-eclipse circuit 120 that the verification circuit 150 has confirmed as properly functioning.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. An image sensor, comprising:
a pixel array comprising a plurality pixels arranged in rows and columns;
an anti-eclipse circuit connected to a column of pixels and comprising:
a first transistor responsive to a first eclipse signal; and
a first eclipse enable transistor;
a verification circuit connected to the anti-eclipse circuit and configured to:
control a voltage level of the first eclipse signal; and
detect a failure in the anti-eclipse circuit comprising:
generate a first test output signal;
generate a second test output signal;
generate a difference signal based on the first test output signal and the second output signal; and
determine if the difference signal varies beyond a predetermined range.

2. The image sensor according to claim 1, wherein the anti-eclipse circuit further comprises a second transistor responsive to a second eclipse signal.

3. The image sensor according to claim 2, wherein the first transistor is directly connected to the first eclipse enable transistor and the second transistor is directly connected to a second eclipse enable transistor.

4. The image sensor according to claim 2, wherein the first transistor and the second transistor are connected in parallel with each other and directly connected to the first eclipse enable transistor.

5. The image sensor according to claim 1, wherein the verification circuit is selectively connected to the anti-eclipse circuit via a switch.

6. The image sensor according to claim 1, wherein the verification circuit is further connected to the pixel array and controls a row select signal for each row of the pixel array.

7. The image sensor according to claim 1, wherein the verification circuit:
applies a first voltage level to the first transistor;
reads out a first test output voltage according to the applied first voltage level;
applies a second voltage level to the first transistor;
reads out a second test output voltage according to the applied second voltage level;
computes a difference output voltage by subtracting the first test output voltage from the second test output voltage; and
generates an error signal if the difference output voltage exceeds a predetermined range.

8. A method for detecting circuit failures in an anti-eclipse circuit, comprising:

providing an image sensor comprising the anti-eclipse circuit, wherein the image sensor is configured to:
evaluate circuit connectivity of at least one circuit path from a plurality of circuit paths in the anti-eclipse circuit comprising:
applying a first test signal to the anti-eclipse circuit at a first time;
reading out a first test output signal at a second time;
applying a second test signal to the anti-eclipse circuit at a third time;
reading out a second test output signal at a fourth time;
determining a difference signal between the first and second test output signals after the fourth time; and
determining if the difference signal is within a predetermined voltage range; and
generate an output signal according to the circuit connectivity evaluation.

9. The method according to claim 8, wherein determining the difference voltage comprises subtracting the first test output signal from the second test output signal.

10. The method according to claim 8, wherein the plurality of circuit paths comprises:
an eclipse enable line; and
an eclipse DAC line.

11. The method according to claim 10, wherein the output signal is one of:
an error signal if a circuit failure exists on the circuit path; and
a verification signal if the circuit path is free of a circuit failure.

12. The method according to claim 8, wherein the image sensor is further configured to select the circuit path from the plurality of circuit paths that is free of a circuit failure.

13. An imaging system, comprising:
a pixel array;
an anti-eclipse circuit connected to the pixel array, wherein the anti-eclipse circuit comprises:
a first transistor responsive to a first test input signal; a first eclipse enable transistor responsive to an eclipse enable signal; and a second transistor responsive to a second test input signal; and
a verification circuit connected to the anti-eclipse circuit and configured to evaluate circuit connectivity of a circuit path used to control the anti-eclipse circuit, wherein evaluating circuit connectivity comprises:
applying a first voltage to the first transistor at a first time;
reading out a first test output voltage at a second time;
applying a second voltage to the first transistor at a third time;
reading out a second test output voltage at a fourth time; and
determining a difference voltage between the first and second test output voltages.

14. The imaging system according to claim 13, wherein the circuit path comprises at least one of:
an eclipse enable line; and
an eclipse DAC line.

* * * * *